United States Patent [19]

Sugitani et al.

[11] Patent Number: 4,558,333

[45] Date of Patent: Dec. 10, 1985

[54] LIQUID JET RECORDING HEAD

[75] Inventors: Hiroshi Sugitani, Machida; Hiroto Matsuda, Yokohama; Masami Ikeda, Machida, all of Japan

[73] Assignee: Canon Kabushiki Kaisha, Tokyo, Japan

[21] Appl. No.: 394,787

[22] Filed: Jul. 2, 1982

[30] Foreign Application Priority Data

| | | | |
|---|---|---|---|
| Jul. 9, 1981 | [JP] | Japan | 56-107414 |
| Jul. 9, 1981 | [JP] | Japan | 56-107415 |
| Jul. 9, 1981 | [JP] | Japan | 56-107416 |
| Jul. 9, 1981 | [JP] | Japan | 56-107417 |

[51] Int. Cl.⁴ .......... G01D 15/18
[52] U.S. Cl. .......... 346/140 R
[58] Field of Search .......... 346/107 R, 140 R, 1.1; 357/72; 430/165

[56] References Cited

U.S. PATENT DOCUMENTS

| | | | |
|---|---|---|---|
| 3,211,088 | 10/1965 | Naiman | 101/114 |
| 3,953,877 | 4/1976 | Sigusch et al. | 357/72 |
| 4,164,745 | 8/1979 | Cielo et al. | 346/140 R |
| 4,330,787 | 5/1982 | Sato et al. | 346/140 R |
| 4,417,251 | 11/1983 | Sugitani | 346/1.1 |
| 4,437,100 | 3/1984 | Sugitani et al. | 346/1.1 |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A liquid jet recording head comprises a discharging orifice for forming flying droplets by discharging a liquid; a liquid pathway having a bent portion, an energy acting portion forming at least a part of said liquid pathway where the liquid filling the internal portion thereof is subjected to energy for droplet formation and an energy generating element for generation of droplet forming energy to be transmitted to the liquid filling said acting portion. The principal part of the wall surface of said liquid pathway is formed of a hardened photosensitive resin.

14 Claims, 25 Drawing Figures

LIQUID JET RECORDING HEAD

BACKGROUND OF THE INVENTION

1. Field of the Invention

This invention relates to a liquid jet recording head, particularly to a liquid jet recording head for generating small droplets of a liquid for recording (so called ink) to be used in a liquid jet recording system wherein the liquid is jetted for recording.

2. Description of the Prior Art

A liquid jet recording head to be applied for a liquid jet recording system is generally provided with minute liquid discharging outlets (orifices), liquid pathways and energy acting portions provided at a part of said liquid pathways, and liquid discharging energy generating portions for generation of the energy for droplet formation to be permitted to act on the liquid in said acting portions.

In the prior art, such a liquid jet recording head was prepared according to, for example a method in which minute grooves are formed on a plate of glass or metal by cutting or etching and then the plate having the formed grooves is joined with another plate having formed discharging orifices to form liquid pathways.

According to such a method of the prior art, however, the roughness of the interior wall surface of the liquid pathways formed by the cutting may be too much, or distortions may be formed in the liquid pathways due to variations in the degree of etching, whereby it is difficult to obtain liquid pathways with constant pathway resistance, and scattering in liquid discharging characteristics may be liable to occur in the liquid jet recording head after manufacturing. Also, chipping and fracture of the plate are liable to occur in cutting, to result in the disadvantage of poor yield of production. And, when etching is performed, a large number of preparation steps are involved which cause a disadvantageous increase in production cost. Further, as the common drawback in the methods of the prior art as described above, in lamination between the groove-bearing plate having grooves for liquid pathways and the lid plate provided with energy generating elements for generation of energy acting on the liquid for recording, difficulty is encountered in registration therebetween, whereby bulk production is rendered infeasible. Accordingly, it has been earnestly desired to develop an ink jet head having a constitution which has overcome these drawbacks.

These points are highlighted as even more serious problems in case of liquid jet recording heads of the type having liquid pathways which are not straight but have flexed or bent portions due to their design.

SUMMARY OF THE INVENTION

The present invention has been accomplished in view of the above drawbacks and its object is to provide a liquid jet recording head which is precise and yet durable and with high reliability.

It is also another object of the present invention to provide a liquid jet recording head having finely worked liquid pathways with good precision and accuracy as well as good yield.

Still another object of the present invention is to provide a liquid jet recording head excellent in discharging efficiency, discharging response characteristics or discharging stability and prolonged continuous recording performance.

Still another object of the present invention is to provide a device capable of high speed recording.

Still another object of the present invention is to provide a recording head of the high density two-dimensional multi-orifice type which can be manufactured with ease and is very practical.

According to an aspect of the present invention, there is provided a liquid jet recording head which comprises a discharging orifice for forming flying droplets by discharging a liquid, a liquid pathway having a flexed in the way, an energy acting portion forming at least a part of said liquid pathway where the liquid filling the internal portion thereof is subjected to energy for droplet formation, and an energy generating element for generation of droplet forming energy to be transmitted to the liquid filling said acting portion to expel a droplet substantially perpendicular to the surface of the substrate. The principal part of the wall surface of said liquid pathway is formed of a hardened photosensitive resin.

According to another aspect of the present invention, there is provided a liquid jet recording head which comprises a plural number of discharging orifices for formation of flying droplets by discharging a liquid, a liquid chamber having at least one liquid supply inlet for supplying the liquid and being communicated to each of these plural number of discharging orifices, and a plural number of heating elements for generation of heat energy provided in the liquid chamber for each of their respective discharging orifices, with each heating element provided so as to face toward its corresponding discharging orifice for expelling a droplet substantially perpendicular to the surface of the liquid chamber floor. The flying droplets are formed by the heat energy generated from said heating elements acting on the liquid thereby generating liquid discharging force.

According to a further aspect of the present invention, there is provided a liquid jet recording head which comprises a plural number of discharging orifices for formation of flying droplets by discharging a liquid, a liquid chamber having at least one liquid supply inlet for supplying the liquid and being communicated to each of these plural number of discharging orifices, and a plural number of energy generating elements for generation of droplet forming energy provided in the liquid chamber for each of their respective discharging orifices, with each of the energy generating elements provided so as to face toward its corresponding discharging orifice. At least a part of the wall surface of said liquid chamber is formed of a hardened photosensitive resin.

DESCRIPTION OF THE DRAWINGS

FIGS. 1 through 7B are schematic drawings for illustration of the construction and the procedures for preparation of a liquid jet recording head which is the first preferred embodiment of the present invention, in which:

FIG. 1 is a schematic perspective view for illustration of the first step;

FIG. 3 is a schematic perspective view for illustration of the third step;

FIG. 4 is a schematic perspective view for illustration of the fourth step;

FIG. 5 is a schematic perspective view for illustration of the fifth step;

FIG. 6 is a schematic perspective view for illustration of the sixth step;

FIG. 7B is a cross-sectional view taken along the line Y-Y' shown in FIG. 7A;

FIGS. 8 through 10B are schematic drawings for illustration of the construction and the procedures for preparation of a liquid jet recording head which is the second preferred embodiment of the present invention, in which:

FIG. 8 is a schematic perspective view for illustration of the first step;

FIG. 9 is a schematic perspective view for illustration of the second step;

FIG. 10B is a partial cross-sectional view taken along the line X-X' shown in FIG. 10A;

FIGS. 11 through 15B are schematic drawings for illustration of the construction and the procedures for preparation of a liquid jet recording head which is the third preferred embodiment of the present invention, in which:

FIG. 11 and FIG. 12A are schematic perspective views for illustration of the first step and the second step, respectively;

FIG. 13 and FIG. 14A are schematic perspective views for illustration of the third step and the fourth step, respectively;

FIG. 15B is a cross-sectional view taken along the line Z-Z' shown in FIG. 15A;

FIGS. 16 through 18B are schematic drawings for illustration of the procedures of the above fifth step, et seq. according an alternative method, in which:

FIG. 16, FIG. 17 and FIG. 18A are schematic perspective views of the fifth step, the sixth step, and the seventh step and the completed head, respectively; and FIG. 18B is a cross-sectional view taken along the line Z-Z' shown in FIG. 18A.

DETAILED DESCRIPTION OF THE PREFERRED EMBODIMENTS

FIG. 1 through FIG. 7B are schematic drawings for illustration of the construction of a liquid jet recording head according to a preferred embodiment of the present invention and procedures for preparation thereof.

Figure 1:
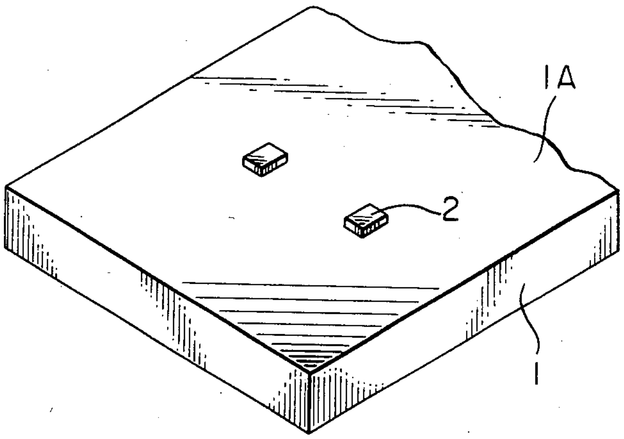
Figure 2A:
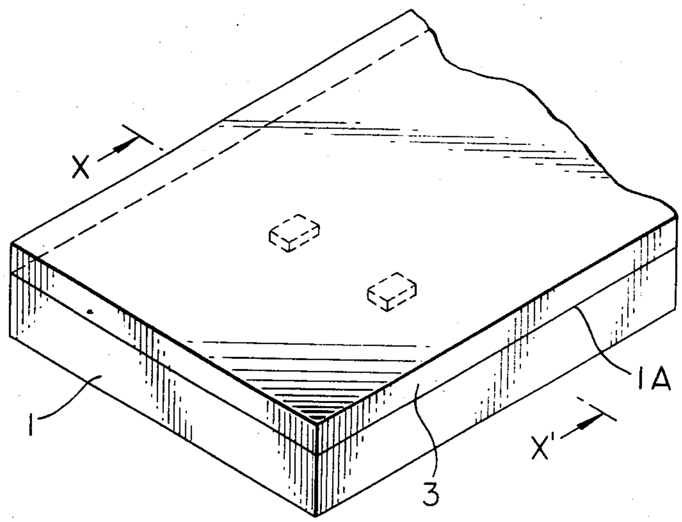
FIG. 2A is a schematic perspective view for illustration of the second step.
Figure 2B:
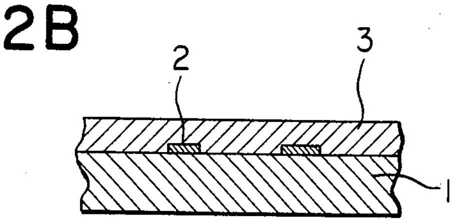
FIG. 2B is a partial cross-sectional view taken along the line X-X' shown in FIG. 2A.

First, in said embodiment, as shown in FIG. 1, a desired number (two in the drawing) of energy generating elements (energy generator) 2 such as piezo elements, etc. for generation of energy for formation of flying droplets are arranged on a suitable substrate 1 such as of glass, ceramics, plastic or metal. Liquid discharging pressure is generated by pressurization of said energy generating elements 2 on the liquid in the neighborhood thereof. To these elements 2, there are connected electrodes for input of signals, although not shown in the drawings. Next, the surface of the substrate 1 having the energy generating elements 2 is cleaned and dried, followed by lamination of a dry film photoresist 3 (film thickness: about 25μ–100μ), which is a photosensitive resin film heated to about 80°–150° C. having a cross-section as shown in FIG. 2, on the substrate surface 1A having the energy generating elements 2 at a speed of 4 feet/min. under the pressurization condition of 0.5–1–3 Kg/cm$^2$. FIG. 2B is a cross-sectional view of FIG. 2A taken along the dash line represented by X-X'. The dry film photoresist 3 is thus fixed by pressure adhesion onto the substrate surface 1A, and it will never be peeled off from the substrate surface 1A, even when more or less external pressure is applied thereon.

Figure 3:
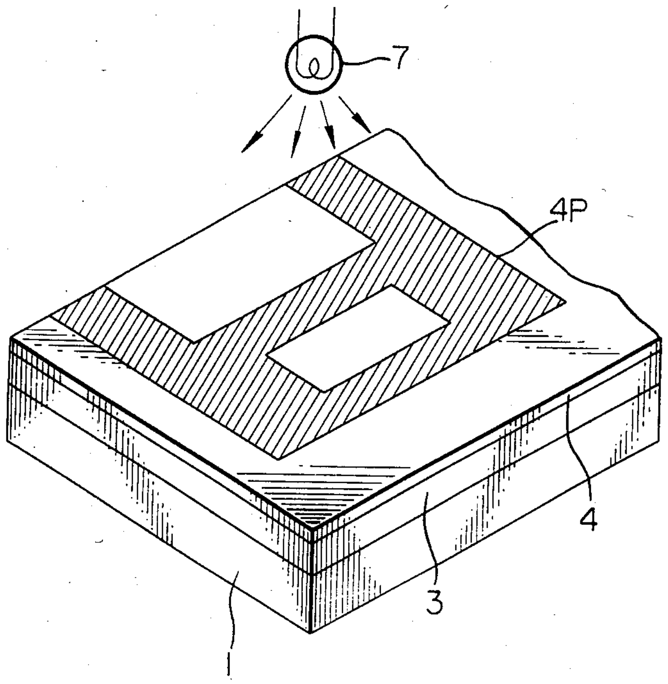

Subsequently, as shown in FIG. 3, on the dry film photoresist 3 provided on the substrate surface 1A, there is superposed a photomask 4 having a desired pattern 4P, and then exposure (arrow-heads in the drawing) is effected thereon from the light source 7 above the photomask 4. The above pattern 4P can cover sufficiently the region of the energy generating element 2 on the substrate 1, and the pattern 4P will not transmit light. Accordingly, the dry film photoresist 3 at the region covered by the pattern 4P is not exposed to light. During this operation, it is also necessary to effect registration between the set position of the energy generating element 2 and that of the above pattern 4P according to a conventional manner. In short, the pattern 4P corresponds to the liquid pathway and hence the arrangement is made with a consideration to have the above element 2 exposed in said pathway.

Having effected light exposure as described above, the photoresist 3 outside the region of the pattern 4P undergoes polymerization reaction to be hardened and become solvent insoluble. On the other hand, the photoresist not exposed is not hardened but remains solvent soluble.

Figure 4:
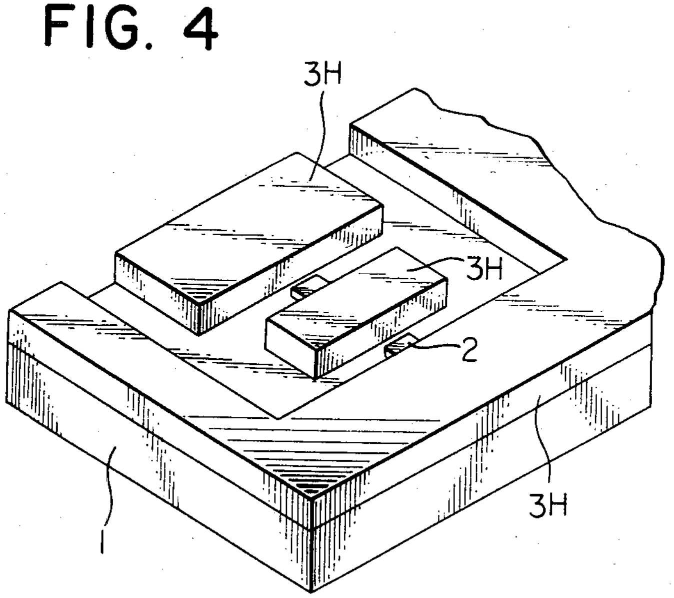

After the exposure procedure, the dry film photoresist 3 may be immersed in a volatile organic solvent such as trichloroethane to dissolve away the unpolymerized (unhardened) photoresist, whereby there is formed on the substrate 1 a hardened photoresist film 3H at the regions excluding the liquid pathway region and the region where the energy generating element exists (FIG. 4). Then, for the purpose of improvement of solvent resistance of the hardened photoresist film 3H remaining on the substrate 1, it is further subjected to hardening, preferably by such a method as thermal polymerization (by heating at 130° to 160° C. for 10 to 60 minutes) or by irradiation of ultra-violet radiation, or by use of a combination of these methods.

The appearance of the intermediate product formed according to the above steps is shown by a perspective view in FIG. 4.

Figure 5:
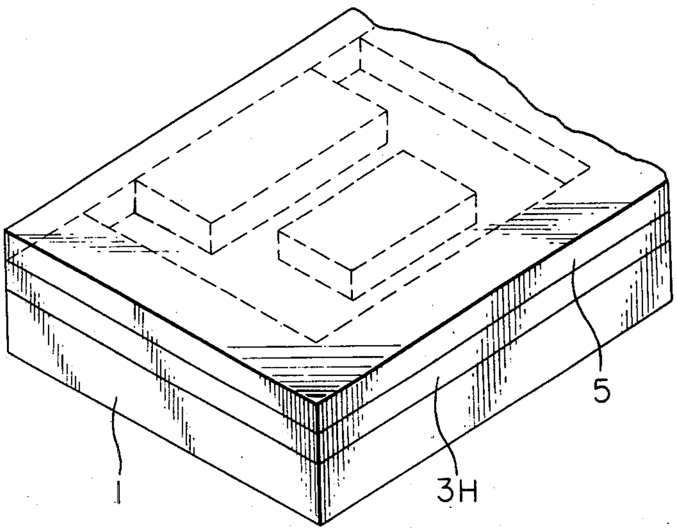

As the next step, the hardened photoresist film surface 3H of the intermediate product shown in FIG. 4 is cleaned and dried, followed by lamination, similarly as in the previous step, of a dry film photoresist 5 (film thickness: about 25μ–100μ) heated to about 80°–150° C. on the film surface 3H at a speed of 0.5–4 f/min. under the pressurization condition of 0.1 Kg/cm$^2$ or less (FIG. 5). In this step, the particular care to be taken in further lamination of the dry film photoresist on the hardened resist film 3H is to prevent the photoresist 5 from sagging toward the liquid pathway groove of the energy generating element 2. For this purpose, since sagging may occur under the lamination pressure prescribed in the previous step, the lamination pressure is set at 0.1 Kg/cm$^2$ or less.

According to an alternative method, pressure adhesion may be effected by providing previously the pressure adhesion means, for example, a pair of rollers with a clearance corresponding to the thickness of the aforesaid resist film 3H. The dry film photoresist 5 can be thereby fixed through pressure adhesion on the hardened film surface 3H, and will be never thereafter peeled off even by application of some external pressure thereon.

Figure 6:
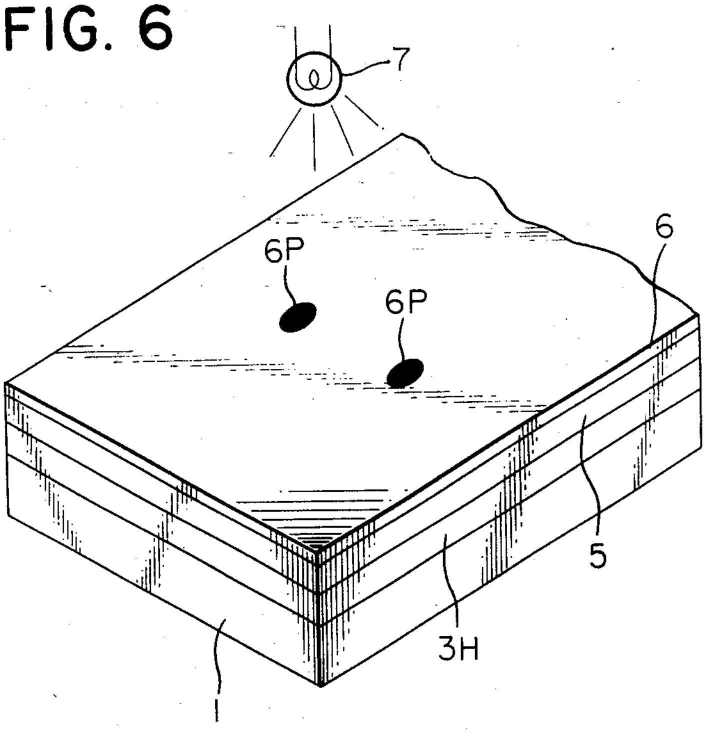

Subsequently, as shown in FIG. 6, on the dry film photoresist 5 newly provided, there is superposed a photomask 6 having a desired pattern 6P, and then exposure is effected thereon from above the photomask 6. The above pattern 6P corresponds to the region which will later constitute the discharging orifice, and the pattern 6P will not transmit light. Accordingly, the dry film photoresist 5 at the region covered by the pattern 6P is not exposed to light. During this operation, it is also necessary to effect registration between the set position of the energy generating element 2 (which is omitted in FIG. 5, FIG. 6) and that of the above pattern 6P according to a conventional manner.

As described above, when the photoresist 5 is exposed to light, the photoresist 5 outside the region of the pattern 6P undergoes polymerization reaction to be hardened and becomes solvent insoluble. On the other hand, the photoresist 5 not exposed to light is not hardened but remains solvent soluble.

Figure 7A:
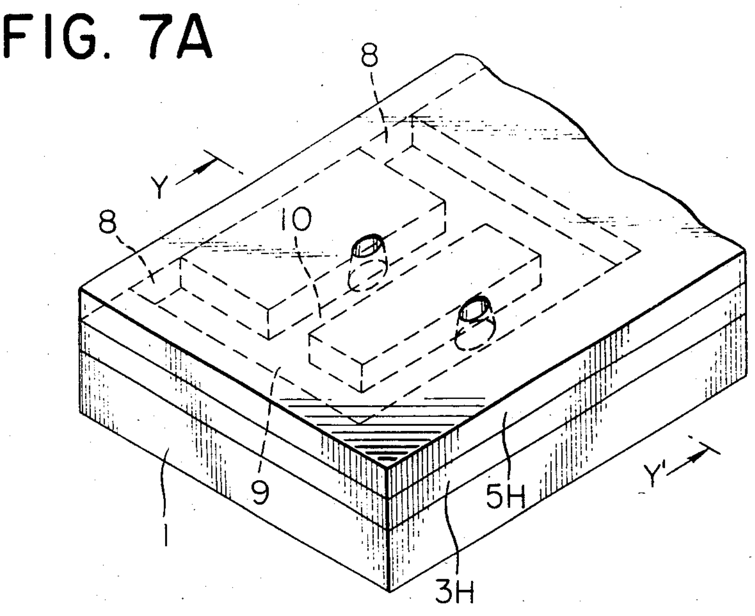
FIG. 7A is a schematic perspective view for illustration of the structure of a completed head.
Figure 7B:
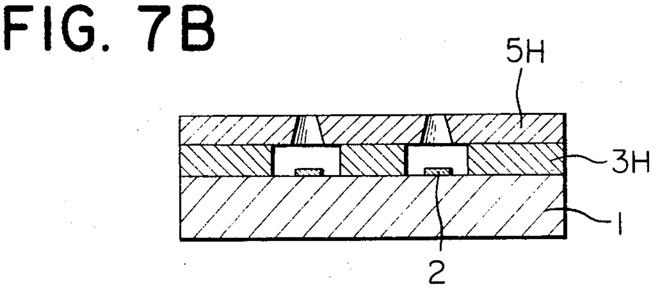

After the exposure procedure, the dry film photoresist 5 may be immersed in a volatile organic solvent such as trichloroethane to dissolve away the unpolymerized (unhardened) photoresist, whereby there is formed in the hardened photoresist film 5H a concave portion corresponding to the pattern 6P as shown in FIGS. 7A and 7B (note: the energy generating element 2 is omitted in FIG. 7A). Then, for the purpose of improvement of solvent resistance of the hardened photoresist film 5H remaining on the foregoing resist film 3H, it is further subjected to hardening, preferably by such a method as thermal polymerization (by heating at 130° to 160° C. for 10 to 60 minutes) or by irradiation of ultra-violet radiation, or by use of a combination of these methods.

Thus, the orifice formed at the hardened photoresist film 5H makes a liquid discharging outlet 7. And, the head manufacturing steps are completed by connecting a certain liquid supply tube to the liquid supply outlet 8.

In the embodiment as described above, as an element for generating energy for formation of flying droplets, a piezoelement is employed by way of example. It should be understood, however, that it is not mentioned as a limitation of the invention. There may also be employed a thermal energy generating element which generates thermal energy as liquid droplet forming energy, as used in the liquid jet recording head disclosed in, for example, U.S. Pat. Nos. 4,243,994 and 4,251,824. Particularly, in this case, it is possible to realize readily formation of a high density multi-orifice, whereby the effect of the present invention can more prominently be exhibited.

Referring now to FIG. 8 to FIG. 10B, the second preferred embodiment of the liquid jet recording head of the present invention is to be described.

Figure 8:
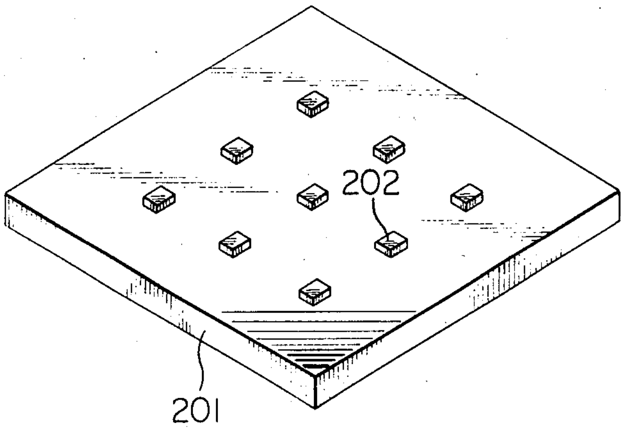

As shown in FIG. 8, there are arranged in an array of two-dimensional matrix of 3×3 heating elements (heaters) 202 such as electrothermal transducers on a suitable substrate such as of glass, plastic, ceramic, Si substrate or metal. Such an element 202 will generate a liquid discharging pressure by heating the ink liquid in the neighborhood thereof. Although not shown in the drawing, electrodes for input of signals are connected to these heating elements 202. As the connection method to be employed in this case, there may be utilized the multi-layer wiring method recently employed in semiconductor industries, in which electrically insulating films such as of $SiO_2$, $Si_3N_4$, polyimide, etc. and electroconductive films such as of Al, Au, etc. are arranged alternately by forming said electroconductive films by means of photolithography to constitute a desired wiring pattern.

Figure 9:
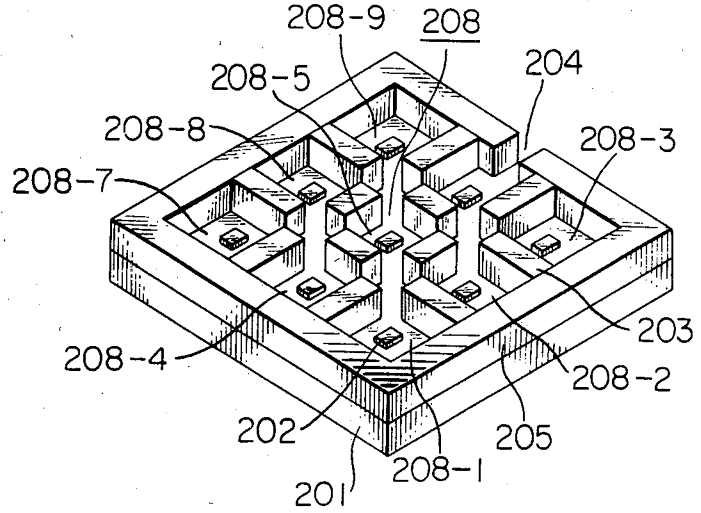
Figure 10A:
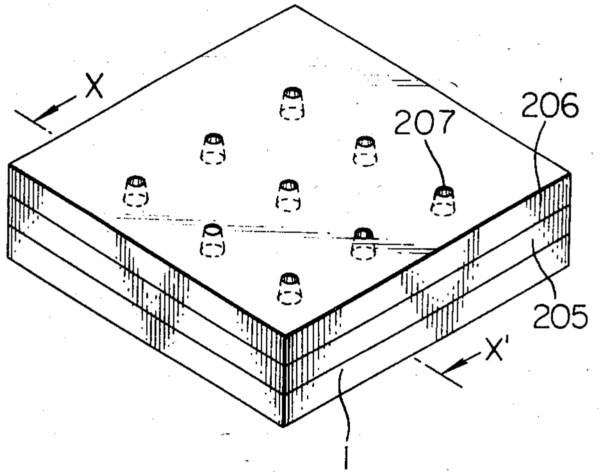
FIG. 10A is a schematic perspective view for illustration of the third step and the construction of a completed head.
Figure 10B:
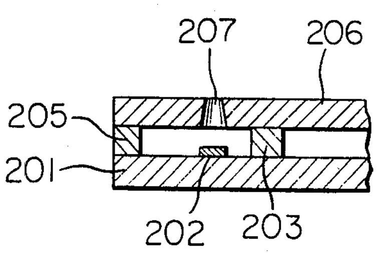

As the next step, in FIG. 9, members 203 and 205 are arranged for formation of ink liquid chambers 208 on the aforesaid substrate 201. The members 203 and 205 can be provided according to the method wherein the parts cut out from glass, plastic or metal are joined with an adhesive. Alternatively, when the plastic is a thermoplastic resin, there may be employed the heat fusion method. The members 203 serve as barriers to keep other segments (heat acting portions) away from the influence of the impact waves generated when one heating element 202 acts on the liquid to discharge the ink liquid through the discharging orifice 207, and they also serve as the support columns for the orifice plate to be joined in the next step. By provision to members 203, the distances between the respective heating elements and the corresponding orifices can easily be made uniform. Although not shown in the drawing, ink supply pipes are connected to the ink supply inlets 204. The liquid chamber 208 is divided into small units by the members 203 in which heat acting portions 208-1 to 208-9 are formed. Each heat acting portion is provided with each one of the heating elements, which are driven independently of each other. Next, as shown in FIGS. 10A and 10B, an orifice plate 206 is joined with the substrate 201 provided with the aforesaid members 203 and 205. Such an orifice plate 206 has orifices 207 provided by cutting of glass, metal or silicon, followed by photoetching, or by electroforming in case of metal. The simplest method for joining may be adhesion with an adhesive or pressure adhesion by means of screws. It should also be noted that registration between the orifices 207 and the aforesaid corresponding heating element 202 is effected so as to confront each other according to a conventional manner.

In addition to the process for production of the head according to the second embodiment as summarized above, it is also possible to produce heads with good production efficiency by use of members in which the members 203, 205 and orifice plate 206 are not in separate forms which separate as different members as shown in FIGS. 9, 10A and 10B, but they are formed integrally in a body. As such a method, for example, there may be mentioned the method in which desired concave-convex portions are provided on a substrate such as of glass, metal, silicon wafer, etc. by photoetching to form a room for liquid chambers. Heating elements are set in respective heat acting portions, which are provided by dividing the liquid chamber room, and on an orifice plate provided with orifices which is adhered onto said substrate.

FIG. 11 through FIG. 15B are schematic drawings for illustration of the construction of the third liquid jet recording head according to a preferred embodiment of the present invention and procedures for preparation thereof.

Figure 11:
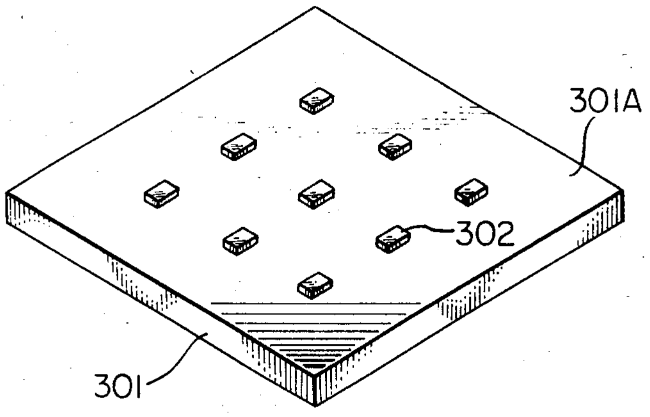
Figure 12A:
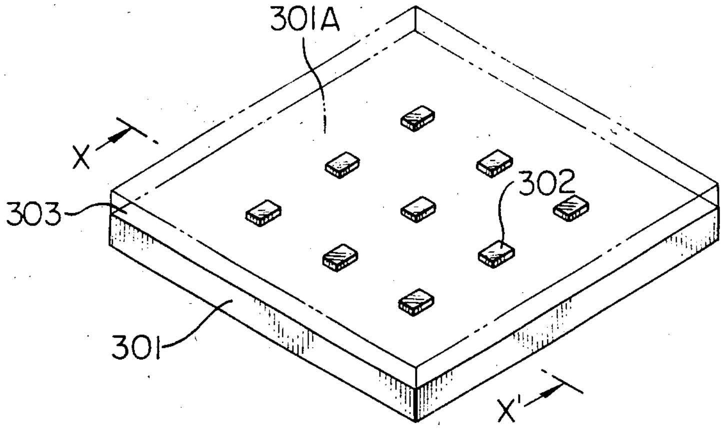
Figure 12B:
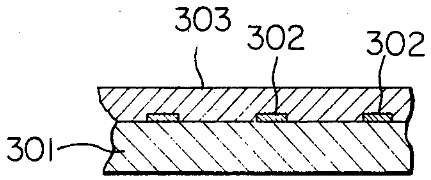
FIG. 12B is a partial cross-sectional view taken along the line X-X' shown in FIG. 12A.

First, as shown in FIG. 11, a desired number (nine in the drawing) of energy generating elements 302, such as heating elements or piezoelectric elements, etc. for generation of ink liquid discharging energy are arranged on a suitable substrate 301, such as of glass, ceramics, plastic or metal. For example, when heating elements are used as said energy generating elements 302, these elements will heat the ink in the neighborhood thereby generating ink discharging pressure as ink liquid discharging energy. On the other hand, when piezoelectric elements are employed, ink discharging pressure is generated by mechanical displacement of the elements. Although not shown in the drawing, electrodes for input of signals are connected to these heating elements 302. As the connection method to be employed in this case, there may be utilized the multi-layer wiring method recently employed in semiconductor industries, in which electrically insulating films such as of $SiO_2$, $Si_3N_4$, polyimide, etc. and electroconductive films such as of Al, Au, etc. are arranged alternately by forming said electroconductive films according to photolithography to constitute a desired wiring pattern. Next, the surface of the substrate 301 provided with the energy generating elements 302 is cleaned and dried, followed by lamination of a dry film photoresist 303 (film thickness: about 25μ–100μ), which is a photosensitive resin film heated to about 80°–150° C. having a cross-section as shown in FIG. 12, on the substrate surface 301A having the energy generating elements 302 at a speed of 0.5–4 f/min. under the pressurization condition of 1–3 $Kg/cm^2$ (FIGS. 12A and 12B). FIG. 12B is a cross-sectional view of FIG. 12A taken along the line represented by X-X′. The dry film photoresist 303 is thus fixed by pressure adhesion onto the substrate surface 301A, and it will never be peeled off from the substrate surface 301A, even when more or less pressure may be applied thereon.

Figure 13:
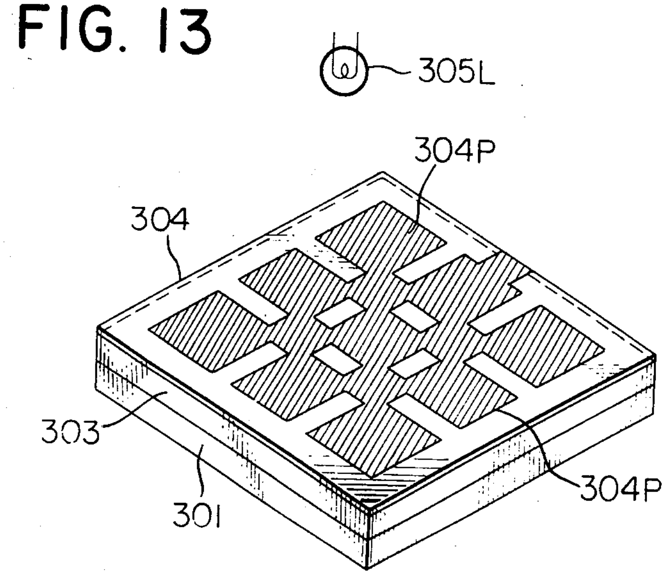

Subsequently, as shown in FIG. 13, on the dry film photoresist 303 provided on the substrate surface 301A, there is superposed a photomask 304 having a desired pattern 304P, and then exposure is effected thereon from the light source 305 above the photomask 304. It should be noted that the above pattern 304P corresponds to the region for forming the ink supply inlet, ink liquid chamber and the energy acting portions provided afterwards by dividing said liquid chamber for respective energy generating elements 302, and the pattern 304P will not transmit light. Accordingly, the dry film photoresist 303 at the region covered by the pattern 304P is not exposed to light. During this operation, it is also necessary to effect registration between the set position of the energy generating element 302 and that of the above pattern 304P according to a conventional manner. In short, the arrangement is made with at least a consideration to the above element 302 being positioned in said energy acting portion in the ink liquid chambers formed afterward.

Having effected light exposure by means of the light source 305 as described above, the photoresist 303 outside the region of the pattern 304P undergoes polymerization reaction to be hardened and becomes solvent insoluble. On the other hand, the photoresist 303 not exposed to the light source is not hardened but remains solvent soluble.

Figure 14A:
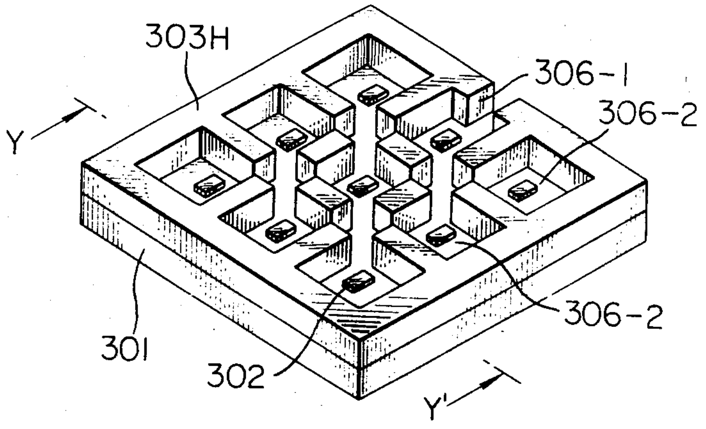

After the exposure procedure, the dry film photoresist 303 may be immersed in a volatile organic solvent such as trichloroethane to dissolve away the unpolymerized (unhardened) photoresist, whereby there is formed concave portions (energy acting portions) according to the pattern 304P except for the hardened photoresist film 303H as shown in FIG. 14A. Then, for the purpose of improvement of solvent resistance of the hardened photoresist film 303H remaining on the substrate 301, it is further subjected to hardening, preferable by such a method as thermal polymerization (by heating at 130° to 160° C. for 10 to 60 minutes) or by irradiation of ultra-violet radiation, or by use of a combination of these methods.

Figure 14B:
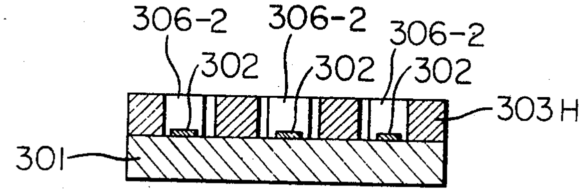
FIG. 14B is a cross-sectional view taken along the line Y-Y' shown in FIG. 14A.

Of the concave portions thus formed on the hardened photoresist film 303H, 306-1 corresponds to the ink supply inlet in the completed head, while 306-2 to the energy acting portion. It should be noted that FIG. 14B is a cross-sectional view of FIG. 14A taken along the line Y-Y′.

Figure 15A:
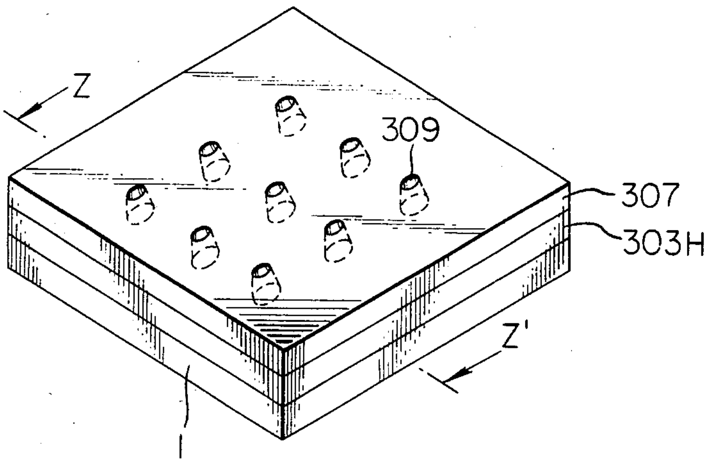
FIG. 15A is a schematic perspective view for illustration of the fifth step and also for illustration of a completed liquid jet recording head.
Figure 15B:
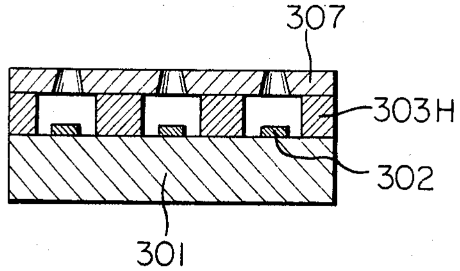
Figure 16:
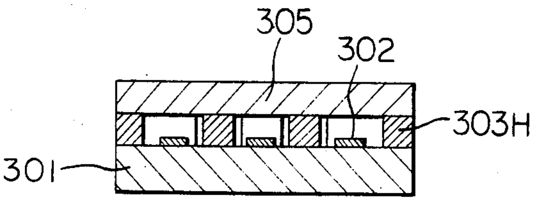

After the steps as described above, a plate 307 having formed orifices 309 is laminated on the upper surface of the substrate 301 having formed grooves for formation of the ink supply outlet 306-1 and energy action portions 306-2, as illustrated in FIGS. 15A and 15B. FIG. 15B is a partial cross-sectional view of FIG. 15A taken along the line Z-Z′. Typical methods include the following:

(1) A flat plate of glass, ceramics, metal or plastic is subjected to spinner coating with an epoxy type adhesive to a thickness of 3 to 4μ, followed by pre-heating to cure the adhesive to the state of so called B-stage. Then, there are formed orifices (discharging outlets) 309 by mechanical perforation according to the same pattern of arrangement as the energy generating elements. The plate is disposed on the photoresist film 303H. At that time, registration is effected to arrange the orifices so as to correspond to the above energy generating elements, followed by full hardening of said adhesive.

(2) In the case where there is employed an orifice plate having orifices formed by photoetching on metal, silicon or glass, or an orifice plate of metal formed particularly by electroforming, joining may be possible by utilization of hardening after the curing of the adhesive to the state of so called B-stage as described above.

(3) A flat plate of a thermoplastic resin, such as acrylic resin, ABS or polyethylene, may be provided with mechanically formed orifices and then applied directly by heat fusion onto the photoresist film 303H.

(4) As the most recommendable method for forming and joining of the orifice plate in addition to the methods (1)–(3) as described above, there is the method in which the dry film photoresist is utilized similarly as in formation of the liquid chamber and the energy acting portions formed by dividing the liquid chamber as previously described. According to this method, the hardened photoresist film surface 303H in FIG. 14A is cleaned and dried, followed by lamination, similarly as in the previous step, of a dry film photoresist 305 (film thickness: about 25μ–100μ) heated to about 80°–150° C. on the film surface 303H at a speed of 0.5–4 f/min. under the pressurization condition of 0.1 $Kg/cm^2$ or less. FIG. 14B shows a cross-sectional view of FIG. 14A taken along the line Y-Y′. In this step, the particular care to be taken in further lamination of the dry film photoresist 305 on the hardened resist film surface 303H is to prevent the photoresist 305 from sagging toward the window opening portion of the energy generating element 302. For this purpose, since sagging may occur under the lamination pressure prescribed in the previous step, the lamination pressure is set at 0.1 $Kg/cm^2$ or less.

Figure 17:
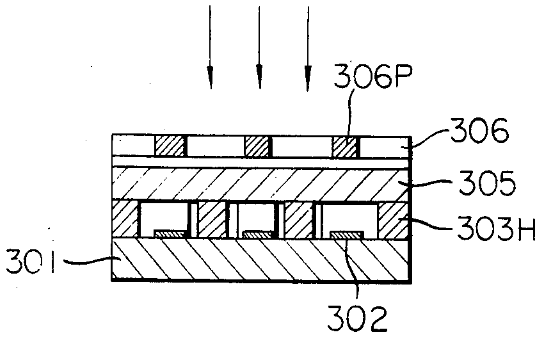

According to an alternative method, pressure adhesion may be effected by providing the pressure adhesion means, for example, a pair of rollers with a clearance corresponding to the thickness of the aforesaid resist film 303H. The dry film photoresist 305 can thereby be fixed through pressure adhesion on the hardened film surface 303H, and will be never thereafter peeled off even by application of some external pressure thereon. Subsequently, as shown in FIG. 17 on the dry film photoresist 305 newly provided, there is superposed a photomask 306 having a desired pattern 306P, and then exposure is effected thereon from above the photomask 306. The above pattern 306P corresponds to the region which will later constitute the discharging orifice, and the pattern 306P will not transmit light. Accordingly, the dry film photoresist 305 at the region covered by the pattern 306P is not exposed to light. During this operation, it is also necessary to effect registration between the set position of the energy generating element 302 and that of the above pattern 306P according to a conventional manner.

As described above, when the photoresist 305 is exposed to light, the photoresist 305 outside the region of the pattern 306P undergoes polymerization reaction to be hardened and become solvent insoluble. On the other hand, the photoresist 305 not exposed is not hardened but remains solvent soluble.

Figure 18A:
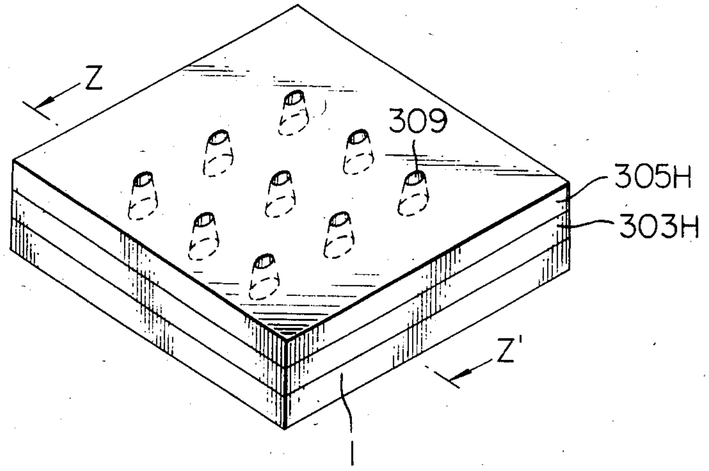
Figure 18B:
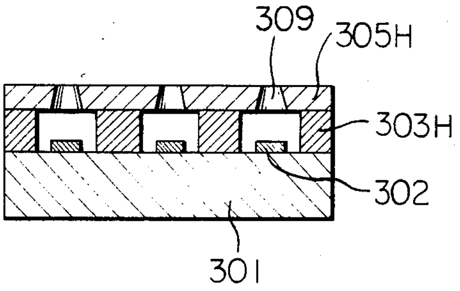

After the exposure procedure, the dry film photoresist 305 may be immersed in a volatile organic solvent such as trichloroethane to dissolve away the unpolymerized (unhardened) photoresist, whereby there is formed on the hardened photoresist film 305H an ink discharging outlet 309 corresponding to the pattern 306P as shown in FIGS. 18A and 18B. Then, for the purpose of improvement of solvent resistance of the hardened photoresist film 305H remaining on the foregoing resist film 303H, it is further subjected to hardening, preferably by such a method as thermal polymerization (by heating at 130° to 160° C. for 10 to 60 minutes) or by irradiation of ultra-violet radiation, or by use of a combination of these methods.

Thus, the ink jet head is completed by forming the orifice (ink discharging outlet) with the hardened photoresist film 305H.

As the effects of the present invention as described in detail above, there may be enumerated the following advantages:

1. Since the primary step of preparation of the head relies on so called photolithographic technique, formation of minute portions of head can very simply be effected with a desired pattern. Further, it is also possible to work a number of heads with the same construction at the same time.

2. A relatively small number of preparation steps can give good productivity.

3. Registration of the principal structural parts can be done easily and assuredly, whereby heads with high dimensional precision can be obtained with good yield.

4. A high density multi-orifice liquid jet recording head can be obtained according to a simple method.

5. Continuous and bulk production is possible.

6. Since no etchant (e.g. strong acids such as hydrofluoric acid) is required to be used, the process is also excellent in safety and hygiene.

7. Substantially no adhesive is required to be used, and therefore there is no trouble such as clogging of the groove by flowing of the adhesive or adhesion of the adhesive to the energy generating element to cause lowering of function.

8. Since the minute principal structural parts of the liquid jet recording head are formed according to photolithography, which photolithography is performed in a clean room generally employed in semiconductor industries, there can be suppressed to a minimum penetration of dust into the internal portion of the ink pathways during assembling of the liquid jet recording head.

What we claim is:

1. A liquid jet recording head, comprising a substrate, a hardened photosensitive material on such substrate defining a plurality of liquid pathways, said hardened photosensitive material constituting the side walls of said liquid pathways, a plurality of energy generating elements disposed on said substrate with one said energy generating element for each of said liquid pathways, and a plate having formed therein a plurality of discharging orifices, with one said discharging orifice for each of said liquid pathways for discharging liquid from the corresponding said liquid pathway, wherein said energy generating elements are disposed to expel liquid through said orifices in a direction substantially perpendicular to the surface of said substrate, and wherein said substrate, said hardened photosensitive film and said plate are laminated together in that order.

2. A liquid jet recording head according to claim 1, wherein each said discharging orifice is provided at the corresponding said energy generating element.

3. A liquid jet recording head according to claim 1, wherein said plate is composed of a hardened photosensitive film.

4. A liquid jet recording head according to claim 1, wherein each energy generating element is a heating element.

5. A liquid jet recording head according to claim 1, wherein said energy generating elements communicate with a common liquid supplying pathway.

6. A liquid jet recording head according to claim 1, wherein each said energy generating element is provided in the corresponding said liquid pathway.

7. A liquid jet recording head according to claim 6, wherein the liquid is supplied from two directions to each said energy generating element.

8. A liquid jet recording head according to claim 6, wherein the liquid flows by passing through said energy generating elements.

9. A liquid jet recording head which comprises a body having a plurality of discharging orifices for formation of flying droplets by discharging a liquid; a liquid chamber having a floor and having at least one liquid supply inlet for supplying the liquid, said liquid chamber being in communication with each of said discharging orifices; and a plurality of heating elements for generation of heat energy provided on the floor of said liquid chamber with one heating element for each said discharging orifice, said plurality of heating elements being provided so that each faces towards its corresponding discharging orifice for expelling liquid through said orifice in a direction substantially perpendicular to the surface of said floor of said liquid chamber, wherein the flying droplets are formed by heat energy generated from said heating elements acting on the liquid to generate liquid discharging force.

10. A liquid jet recording head according to claim 9, wherein said liquid chamber is sub-divided two-dimensionally into compartments of a number corresponding to the number of said plurality of heating elements.

11. A liquid jet recording head according to claim 9, further comprising a plurality of liquid chambers.

12. A liquid jet recording head which comprises a body having a plurality of discharging orifices for formation of flying droplets by discharging a liquid; a liquid chamber having a floor and having at least one liquid supply inlet for supplying the liquid, said liquid chamber being in communication with each of said plurality of discharging orifices; and a plurality of energy generating elements for generation of droplet forming energy provided on the floor of said liquid chamber with one heating element for each said discharging orifice, said plurality of energy generating elements being provided so that each faces toward its corresponding discharging orifice for expelling liquid from said orifice in a direction substantially perpendicular to the surface of said floor of said liquid chamber, wherein at least a part of the wall surface of said liquid chamber is formed of a hardened photosensitive resin.

13. A liquid jet recording head according to claim 12, wherein said liquid chamber is sub-divided two-dimensionally into compartments of a number corresponding to the number of said plurality of energy generating elements.

14. A liquid jet recording head according to claim 12, further comprising a plurality of liquid chambers.

* * * * *

UNITED STATES PATENT AND TRADEMARK OFFICE

CERTIFICATE OF CORRECTION

PATENT NO. : 4,558,333

DATED : December 10, 1985

INVENTOR(S) : HIROSHI SUGITANI, ET AL.

It is certified that error appears in the above-identified patent and that said Letters Patent is hereby corrected as shown below:

Column 2, lines 12-13, change "in the way" to --portion--.

Column 4, line 6, change "speed of 4" to --speed of 0.5-4--; and
line 7, change "0.5-1-3" to --1-3--.

Column 10, line 34, after "each" insert --said--.

Signed and Sealed this

*Nineteenth* Day of *August 1986*

[SEAL]

*Attest:*

DONALD J. QUIGG

*Attesting Officer* *Commissioner of Patents and Trademarks*